US009299206B2

(12) United States Patent
Angus et al.

(10) Patent No.: US 9,299,206 B2
(45) Date of Patent: Mar. 29, 2016

(54) APPARATUS AND METHOD FOR CURRENCY TRACKING

(71) Applicant: NCR CORPORATION, Duluth, GA (US)

(72) Inventors: Robin Angus, Fife (GB); Andrew Monaghan, Dundee (GB); John McRobert, Airdrie (GB); Neil Law, Dundee (GB); Alan James Finnie, Dundee (GB)

(73) Assignee: NCR Corporation, Duluth, GA (US)

( * ) Notice: Subject to any disclaimer, the term of this patent is extended or adjusted under 35 U.S.C. 154(b) by 43 days.

(21) Appl. No.: 13/686,508

(22) Filed: Nov. 27, 2012

(65) Prior Publication Data

US 2014/0144976 A1 May 29, 2014

(51) Int. Cl.

| | |
|---|---|
| ***G06K 7/00*** | (2006.01) |
| ***G07D 7/00*** | (2006.01) |
| ***G07D 7/12*** | (2006.01) |

(52) U.S. Cl.

CPC ................ *G07D 7/0006* (2013.01); *G07D 7/12* (2013.01)

(58) Field of Classification Search

USPC .......................................... 235/375, 379, 486

See application file for complete search history.

(56) References Cited

U.S. PATENT DOCUMENTS

| | | | | |
|---|---|---|---|---|
| 6,065,672 | A * | 5/2000 | Haycock | 235/379 |
| 6,976,634 | B2 * | 12/2005 | Washington et al. | 235/486 |
| 8,550,338 | B1 * | 10/2013 | Nichols et al. | 235/379 |
| 2002/0029728 | A1 * | 3/2002 | Walker | 109/25 |
| 2003/0230464 | A1 * | 12/2003 | Deaville et al. | 194/302 |
| 2004/0257601 | A1 * | 12/2004 | Tomiyasu et al. | 358/1.9 |
| 2013/0140358 | A1 * | 6/2013 | Graef et al. | 235/379 |

* cited by examiner

*Primary Examiner* — Daniel Hess

(74) *Attorney, Agent, or Firm* — Schwegman, Lundberg, Woessner

(57) ABSTRACT

A currency container, method of managing a currency container and a cash management system are disclosed. The currency container includes a container body such as a rigid cassette or flexible bag for storing currency notes. The container includes at least one near field communication (NFC) tag for indicating information associated with the container such as an ID of the container and/or a value of currency stored in the container.

15 Claims, 6 Drawing Sheets

FIG. 4
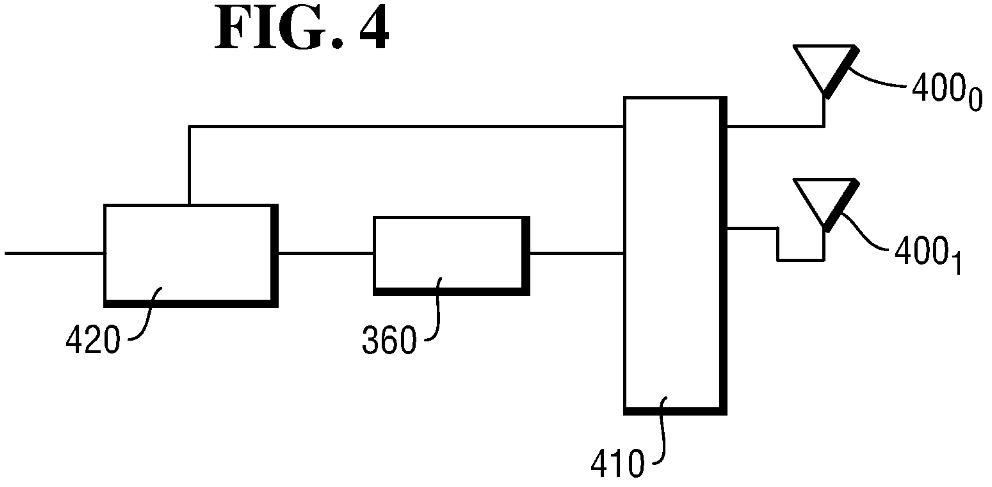
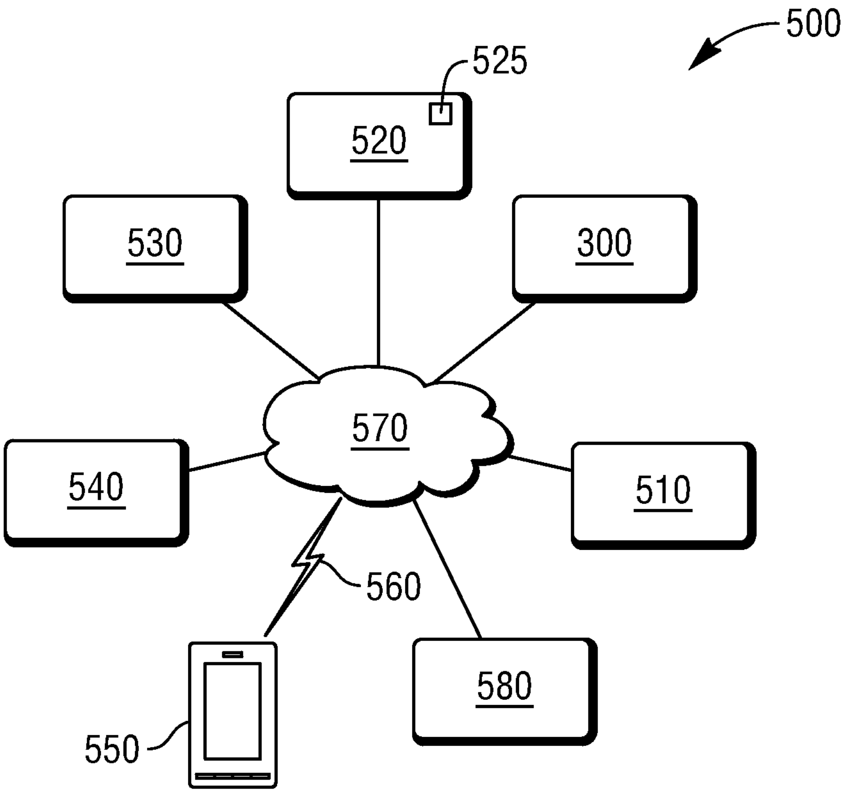
FIG. 5

APPARATUS AND METHOD FOR CURRENCY TRACKING

FIELD OF THE INVENTION

The present invention relates to a method and apparatus which enables currency notes to be tracked within a financial institution and/or a cash management system. In particular, but not exclusively, the invention relates to a currency container such as a currency cassette or cash in transit bag which includes at least one near field communication (NFC) tag. The tag can be used to indicate information associated with the container (such as a unique ID of the container and/or a value of currency in the container) as the container is moved around or used.

It is known from time to time that valuable items of media such as currency notes, vouchers, stamps, checks or the like, must be moved from one location to another. Since the valuable items have an inherent value, their movement from one place to another must be carried out in a secure manner to avoid theft or tampering. Often, the valuable items of media are moved in a valuable media container (VMC) which may be in the form of a rigid secure box which can be locked, or a bag which is sealed after being filled by an authorized user. At all times it is advantageous to be able to know that the contents of a container, once filled by authorized personnel, remain intact, and that unauthorized personnel have not made an attempt to open the container to remove its contents. Evidence of an attempt at tampering with the container is often hard to come by. Likewise, some conventional containers are able to indicate that tampering has occurred but provide no information as to when or where the tampering occurred or of who may have attempted to open the container.

A particular type of valuable item of media is a currency note. Such items are stored and deposited and dispensed at various locations such as bank branches via a teller or a bank branch via an Automated Teller Machine (ATM) or via a network of ATMs located geographically at pre-determined sites. At all times, it is important for a bank or other such financial institution to know what currency is where in a cash management system. This is important for security purposes and also for the purposes of management in terms of predicting when and where currency notes will run out ahead of a need so new notes can be ordered to minimize disruption to account holders' day to day business. Likewise, when too much currency is accumulated at any one location, a cash management system needs to be able to predict when authorized personnel need to be dispatched to pick up excess quantities so as to minimize risk.

To secure internal transactions, most banks currently operate on a "two pairs of eyes" policy. As such, each transaction in which currency notes or other such cash transfers take place must be conducted with a second bank employee as a witness. This means that there is a negative impact on productivity wherever cash transactions are to be carried out and that staff members must often be used to supervise cash as it is re-located from one location to another in a financial institution or within a broader financial system. Even in small to medium-size branches, this activity can easily add up in time terms to more than one full-time equivalent staff member. Across a branch network this accumulates to be a significant negative contribution to operating efficiency and thus increases operational costs.

Many valuable media containers (VMCs) are in use around the world today. It is appreciated that the replacement of many or all of these containers to facilitate any improved cash management scheme that is proposed would be a huge burden in terms of expense for current financial institutions.

SUMMARY OF THE INVENTION

It is an aim of the present invention to at least partly mitigate the above-mentioned problems.

It is an aim of certain embodiments of the present invention to provide a currency container such as a currency cassette or bag which can be made "intelligent" (or "smart") so that the container itself can store information about the container and its contents which can thus be tracked as the container is moved from one place to another or is put in operation.

It is an aim of certain embodiments of the present invention to provide a Self-Service Terminal (SST) such as an Automated Teller Machine (ATM) or kiosk or dispenser or the like which includes a docking system that automatically and repeatedly or continuously reads information stored in a nearby intelligent container.

It is an aim of certain embodiments of the present invention to provide a method of tracking currency as the currency moves around a cash management system.

It is an aim of certain embodiments of the present invention to track events associated with a currency container and associate times, people and/or places with those events, as they occur or after they have occurred.

It is an aim of certain embodiments of the present invention to provide a cash management system which includes multiple currency containers and Self-Service Terminals (SSTs) which can constantly store and update data identifying a location and/or amount of currency and/or event associated with each of the containers in the system.

It is an aim of certain embodiments of the present invention to provide a currency dispenser and a method of operating a currency dispenser whereby data is constantly or repeatedly transmitted to and from a currency container and a terminal storing the container or in which a container is transported.

It is an aim of certain embodiments of the present invention to provide a method of managing a currency cassette which enables records to be created for currency containers and for scheduling to be carried out to arrange for replenishment or emptying of the container at an appropriate point in time.

According to a first aspect of the present invention there is provided a currency container for currency notes, comprising:

- a container body for storing a plurality of currency notes; and
- at least one NFC tag for indicating at least one parameter associated with the container.

Aptly, the parameter comprises a unique ID code of the container and/or currency type identifier for currency notes stored in the container and/or a number of notes stored in the container.

Aptly, the NFC tag comprises at least one data store that stores time and/or date data associated with a pre-determined event.

Aptly, the pre-determined event comprises the container body being tampered with and the container further comprises at least one tamper switch.

Aptly, the container further comprises at least one visual and/or audible cue that receives a trigger signal responsive to the tamper switch determining that a tamper event has occurred.

Aptly, the pre-determined event comprises coincidence with a pre-determined time and/or date and the container further comprises an environmental sensor.

Aptly, the currency container further comprises a rechargeable battery or super capacitor or other such power source connected to the NFC tag.

Aptly, the currency container NFC tag comprises a data store.

Aptly, the data store is read only.

Aptly, the data store is a read/write data store.

Aptly, the data store has a write cycle of more than 500,000 writes.

Aptly, the data store has a write cycle of more than 100,000,000,000 writes and comprises FRAM.

Aptly, the NFC tag has a maximum working distance of less than 20 cm.

Aptly, the NFC tag has a maximum working distance of less than 5 cm.

Aptly, the NFC tag is a passive NFC tag.

Aptly, the NFC tag is an active NFC tag.

Aptly, the container body comprises a flexible tamperproof bag.

Aptly, the container body comprises a currency cassette.

According to a second aspect of the present invention there is provided a Terminal comprising:

at least one docking station for a currency cassette; and at least one NFC reader device for wirelessly reading data from an NFC tag in a currency cassette docked in the docking station.

Aptly, the terminal is a Self-Service Terminal (SST).

Aptly, the terminal is a Teller-Serviced Terminal (TST) or Office Equipment Device (OED) or the like.

Aptly, the SST is an Automated Teller Machine (ATM).

Aptly, the SST is a dispenser.

Aptly, the reader device is a contactless reader that reads data stored in a proximate NFC tag.

Aptly, the reader device further comprises an NFC device re-charger that wirelessly re-charges power in a proximate NFC tag.

Aptly, the SST further comprises:

a multiplexer;

a Reed switch interface; and at least one processor that sets switches in the Reed switch interface responsive to data read from a proximate NFC tag.

According to a third aspect of the present invention there is provided a method of tracking currency, comprising the steps of:

associating at least one currency note with a currency container comprising an NFC tag; and tracking events associated with said currency container via one or more NFC readers.

Aptly, the step of tracking events comprises:

determining when the currency container is located at a pre-determined location.

Aptly, the step of tracking events comprises:

determining if the currency container has been tampered with.

Aptly, the step of tracking events comprises determining if the currency container is in transit.

According to a fourth aspect of the present invention there is provided a cash management system, comprising:

a plurality of currency containers for storing currency notes, each associated with at least one NFC tag for indicating at least one parameter associated with the container;

a plurality of Self-Service Terminals (SSTs), each comprising at least one docking station for a currency cassette and at least one NFC reader device that wirelessly reads data from an NFC tag in a currency cassette docked in the docking station; and at least one server node connected to each SST via a communication network to receive data associated with a currency container in an SST from said an SST.

According to a fifth aspect of the present invention there is provided a cash management system, comprising:

a server connectable to a plurality of Self-Service Terminals (SSTs) via a communication network; wherein the server is operable to receive data associated with a currency cassette docked in each SST from said SSTs and comprises a memory that updates responsive to data received from SSTs to maintain a running total of currency in said SSTs.

According to a sixth aspect of the present invention there is provided a currency dispenser or replenisher, comprising:

a pick unit for receiving a currency cassette;

an NFC reader associated with the pick unit and operable to read an NFC tag mounted on a currency cassette; and a transceiver or transmitter operable to communicate data from the NFC tag on the currency cassette for use in currency tracking.

Aptly, the dispenser is operable to create and store a log of banknotes dispensed from the currency cassette.

Aptly, the log of banknotes comprises, for each dispensed banknote, a denomination of the dispensed banknote and a unique identifier associated with a currency cassette from which that banknote is dispensed.

Aptly, the NFC reader is located in a portable device which is optionally a mobile phone or tablet PC.

Aptly, the NFC reader is located in a currency dispenser in which a currency cassette is located.

Aptly, the currency dispenser is operable to record a number of banknotes dispensed from the currency cassette.

Aptly, the currency dispenser is operable to program the NFC tag to include a number of banknotes remaining in the currency cassette.

Aptly, the NFC reader is located in a vault storage device into which the currency cassette is inserted to await replenishment or redeployment.

According to a seventh aspect of the present invention there is provided a method of managing a currency cassette, comprising the steps of:

creating a record associated with a unique cassette identifier associated with a respective currency cassette;

receiving information from an NFC reader, said received information including a unique identifier of, and a number of banknotes remaining in, the currency cassette; and scheduling replenishment for the cassette based on the received information.

Aptly, the method further comprises the step of:

receiving an indication from an NFC reader that the currency cassette has been accessed in an unauthorized manner.

Aptly, the method further comprises storing information relating to details of the unauthorized access.

Aptly, the stored information comprises date information and/or time information and/or location information associated with the unauthorized access.

Certain embodiments of the present invention provide a "smart" or "intelligent" container, such as a cassette or bag for currency notes, which includes one or more near field communication (NFC) tags for indicating one or more parameters associated with the container. The tag can store a unique identifier and/or currency note information and this can be automatically read and tracked as the container moves around a cash management system or during use.

Certain embodiments of the present invention provide a currency cassette which has a tamperproof or tamper evident body and which includes a tamper detector that can be used to trigger one or more alarms and/or irreversibly lock the container and/or trigger ejection of spoiling material such as indelible ink.

Certain embodiments of the present invention provide apparatus which can be retro-fitted to conventional currency cassettes and which enables the so modified currency cassettes to operate in a way compatible with conventional techniques or to be tracked by mobile or fixed terminals in an automated way via NFC readers and trackers.

Certain embodiments of the present invention enable currency containers to be tracked in a highly convenient manner by personnel who must be provided only with a smartphone or other such handheld reader. Alternatively, NFC reader capability can be incorporated in a fixed terminal such as an SST and tracking occurs automatically as containers are loaded into the terminal and used.

Certain embodiments of the present invention provide a cash management system which is able to continuously and automatically track containers and currency notes in use as they are utilized over a period of time. The system is able to predict when currency notes should be replenished at particular locations or when currency notes should be picked up from a location due to an overabundance.

Certain embodiments of the present invention enable events associated with currency containers to be tracked and for further information such as personnel who have access to the containers at the time and location where such events occur. In this way, an audit trail can be improved with respect to conventional cash management systems.

BRIEF DESCRIPTION OF DRAWINGS

Embodiments of the present invention will now be described hereinafter, by way of example only, with reference to the accompanying drawings in which:

FIG. 4 illustrates a block diagram of the terminal shown in FIG. 3 can read an NFC tag in a currency container or can detect the presence of magnets provided in conventional currency containers;

FIG. 5 illustrates a cash management system;

DESCRIPTION OF EMBODIMENTS

Figure 1:
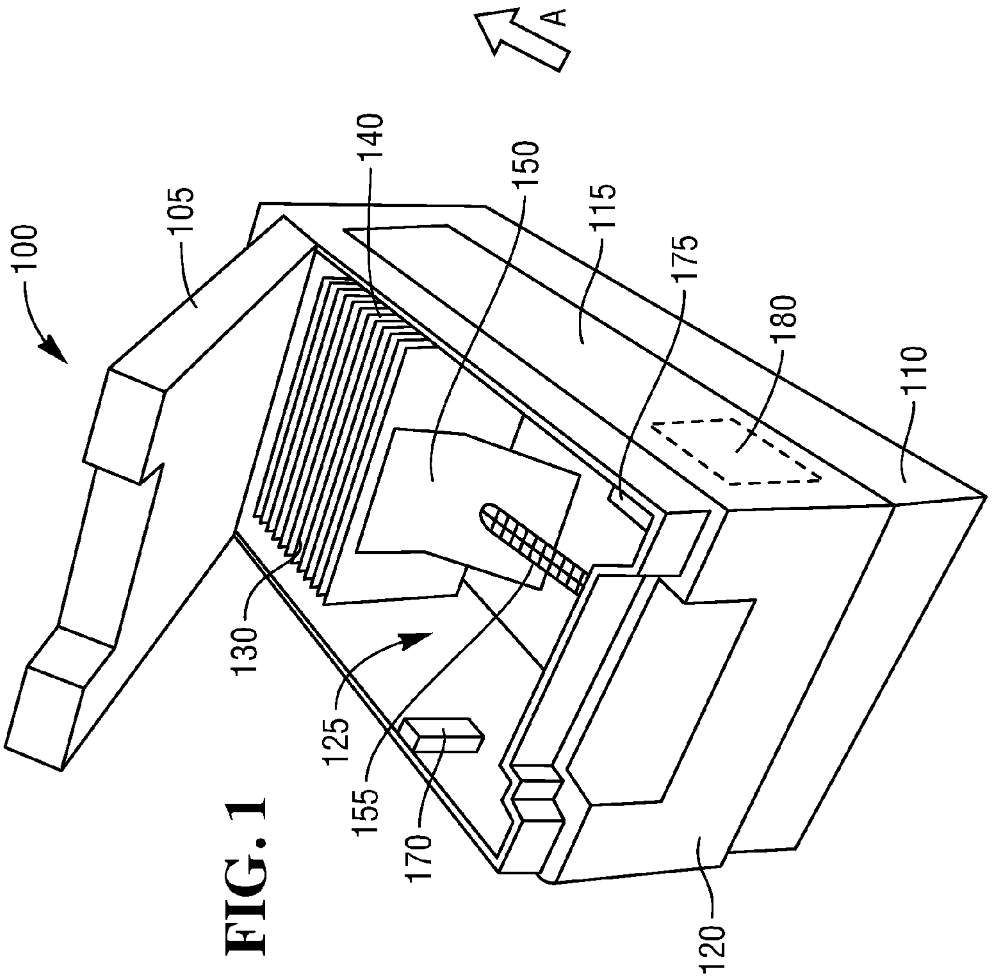
FIG. 1 illustrates a currency cassette according to an embodiment of the present invention.

In the drawings like reference numerals refer to like parts.

FIG. 1 illustrates a currency container 100 in the form of a currency cassette, according to an embodiment of the present invention. It will be appreciated that certain embodiments of the present invention are broadly applicable to containers used to transport items of media such as currency notes, checks, vouchers, stamps or the like, from one location to another. As such, the currency cassette is an example of a valuable media container (VMC). A container may be a cash in transit (CIT) cash box, an ATM cassette, a bag, a check container or, more generally, any valuable media container or the like. The currency cassette 100 illustrated in FIG. 1 includes a lid 105 and a base 110. Side walls 115 extend along a length of the cassette and the cassette body also has two ends 120. The ends 120 and side walls 115 are spaced apart from each other to define a chamber 125 which can be used to store a stack 130 of currency notes 140. The currency notes 140 are sheet-like items of media. The stack 130 of currency notes is continually urged by a pusher plate 150 in the direction illustrated by arrow A in FIG. 1 towards a pick window (not shown) in an end wall at an end of the currency cassette 100. The pusher plate 150 is constantly biased by a spring 155 which urges the pusher plate 150 towards the pick window end of the currency cassette. The lid 105 and body of the cassette are made of a rigid tamperproof material so that when the lid is closed and locked and the shutter of the pick window is closed, the container provides a housing to which unauthorized personnel cannot gain access. Likewise, even authorized personnel, that is to say, personnel tasked with the job of transporting the currency cassettes, cannot gain unauthorized access.

The currency cassette 100 illustrated in FIG. 1 has a permanent lock 170 in addition to its normal locking mechanism (not shown) which can be triggered when a determination is made (as described hereinbelow) that someone is tampering with the currency cassette. Once triggered, the lock 170 cannot be released without destroying the cassette or without a special security key. The currency cassette 100 shown in FIG. 1 also illustrates a charge 175 of dye. If a determination is made (as described hereinbelow) that an unauthorized attempt has been made to access the currency cassette, the charge 175 may be triggered to void the media.

The currency cassette 100 as illustrated in FIG. 1 also includes a near field communication (NFC) tag 180. There are many NFC tag types available in various ISO standards such as ISO 15693, ISO 14443-A, ISO 14443-B, ISO 14443-B (SRIxx) and ISO 18092. It will be appreciated that certain embodiments of the present invention are not restricted to NFC tags having any pre-determined ISO standard compatibility. Rather, certain embodiments of the present invention are broadly applicable to the use of NFC tags. Aptly, the NFC tag 180 is powered by and read via an antenna using a frequency of about around 13.56 MHz.

It will be appreciated that NFC is a set of short-range wireless technologies which require devices communicating with each other to be separated by a distance of 20 cm or less. Aptly, communication between a tag and reader occurs over a distance of 4 cm or less. The communication operates at about around 13.56 MHz with data rate exchanges ranging from about around 106 kbit/s to 424 kbit/s. In passive NFC tags a reader acts as an initiator device and provides a carrier field whilst the NFC tag acts as a target device answering the field generated by the initiator device by modulating the existing field. In this way, the target device may draw its operating power from the initiator-provided electromagnetic field. This is thus a passive communication mode. Certain embodiments of the present invention can optionally use such passive NFC tags or alternatively can utilize NFC tags able to operate in a so-called active communication mode. In this mode, both the initiator device and target device communicate by alternatively generating their own fields. Each device de-activates its own RF field whilst waiting for data. Active NFC tags thus have their own power (which may aptly be rechargeable) and are able to generate their own detectable field.

The NFC tag 180 illustrated in FIG. 1 stores a unique identifier (UID) as well as having 2 k plus bytes of storage. The tag has a write cycle of $10^{15}$ writes. It will be appreciated that certain embodiments of the present invention can utilize a "basic" NFC tag which simply contains a UID. This is generally a unique hexadecimal identifier up to 16 bytes and has read only value and no modifiable data available. Alternatively, a "basic storage" tag can be utilized which contains a UID as well as an additional 48 bytes of storage which may be read four words at a time and written one word at a time. This form of storage has a limitation in that it has a maximum write cycle of 10,000 writes. Basic storage tags allow storage of note types denomination, exponent details, note sizes, thresholds, as well as cassette ID. Certain embodiments of the present invention can use "larger storage" tags which contain a UID as well as 2 k plus bytes of storage and which have similar read/write characteristics as the basic storage tag. Such larger storage tags, however, have a write cycle of between 1 million writes and $10^{15}$ writes and therefore can contain tally and telemetry information in addition to the information held by other tag types. Certain alternative embodiments utilize WRITE ONCE memory which can be used to identify valid NCR tags.

Data stored in an NFC tag may be read and/or write protected and the information associated with the data which is stored may include one or more of a unique identifier (i.e. equivalent to a "MAC" address), a unique container ID (equivalent to an "IP" address), an identifier for an original manufacturing plant of the container, an identifier for a manufacturing date associated with the container, a last date of service, a last service location identifier, a health status (i.e. either "green", "orange", "red" or some other specific percentage of transactions ended non-nominal), an identifier of a last cash point where the container was/is inserted, an identifier of the last synchronization time, date and time zone, a number of automated note movements through the cassette, a number of objects currently stored in the container, a main currency type stored in the container, a main denomination currently stored in the container, a current security status, a last security status, a last security status time, date and time zone, five customized fields per object, an object list currently stored in the container, a number of objects in the container, an order of objects in the container with a direction of order identifier, a unique object ID for each object stored in the container (i.e. banknote serial number for each stored banknote), an ISO code if an object stored in the container is a banknote, check, voucher or the like, an object denomination, an object emission (month/year), an object fitness level (use ECB for base), an object authenticity level (use ECB for base) and/or an actual object size for one or more objects in the container.

Figure 2:
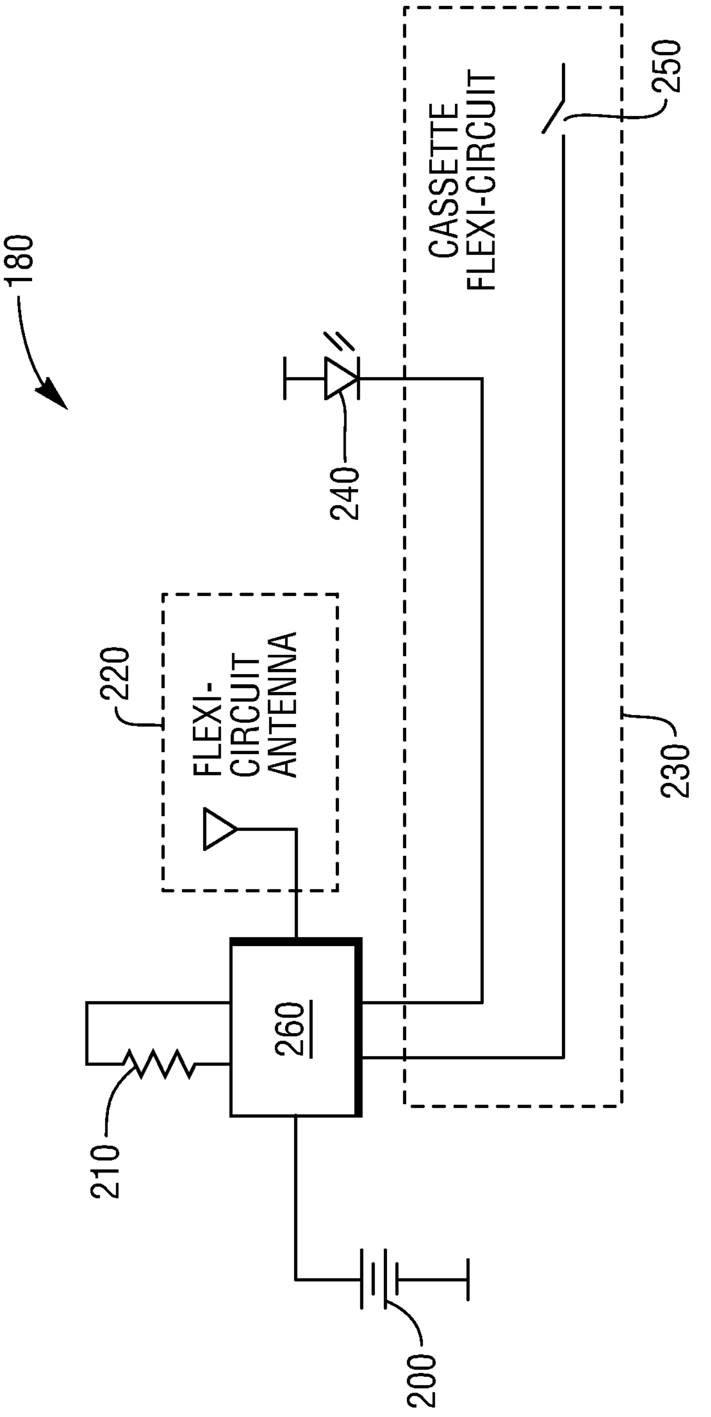
FIG. 2 illustrates circuitry associated with a near field communication (NFC) tag in the currency cassette shown in FIG. 1.

FIG. 2 illustrates an NFC enabled CPU which is secured as an NFC tag 180 to the cassette 100 illustrated in FIG. 1. The tag 180 is an active tag and thus includes a battery 200. Aptly, the battery 200 is a rechargeable battery. The tag 180 also includes a temperature sensor 210 or other such environmental sensor. The temperature sensor can be monitored to detect when a lid of the cassette is opened. A change in temperature or other such environmental parameter is used to trigger an alarm. The tag 180 also includes a flexible antenna circuit 220 which is used for near field communication with an initiator device. A flexi-circuit 230 extends within the container from the tag to a tri-color LED 240 or other such indicator. This enables a visible cue to be triggered indicating when a container has been tampered with and/or opened. Aptly, the cue is a visible or audible and/or visible and audible cue. A tamper switch 250 is a contact switch which determines when a lid is separated from a remainder of the body of the container. Alternatively, or additionally, a tamper switch may be utilized to identify unauthorized ingress through a pick window or other such opening. Optionally, a further security feature is included to prevent overriding through exposure to a large magnetic field or immersion in water. Particular areas of interest are the cassette lid, pick window and the holder for the NFC tag.

When the switch 250 indicates a break in circuit, a determination is made that an attempt has been made to access the container. This is an example of an event which can be logged and stored via the processor 260 of the NFC tag 180. New containers may be manufactured to include the NFC tag 180 shown in FIG. 2 or such tags may be retro-fitted to conventional containers.

The tag is contactless in the sense that the tag is able to communicate with an NFC reader which is also able to recharge the power source such as battery 200 or supercapacitor or the like. The processor 260 continually monitors for a tamper condition and, with the use of an on-board real-time clock, can log an exact time that a cassette or container is open/tampered with. This information can be extracted from the container at a later moment in time with the use of an NFC reader. The NFC reader may be a mobile terminal or may be integrated into an existing self-service hardware item or transport element or storage zone.

The NFC tag 180 allows each currency cassette to have a unique ID stored for identification and non-volatile storage to be used to store logging information and other cassette details as noted above. Additional environmental information such as temperature and/or humidity or the like can also be collected and stored over a period of time. Aptly, the circuitry can be utilized to prevent unauthorized access by triggering a permanent lock or by voiding contents by firing a dye package to void the media as noted above.

Figure 3:
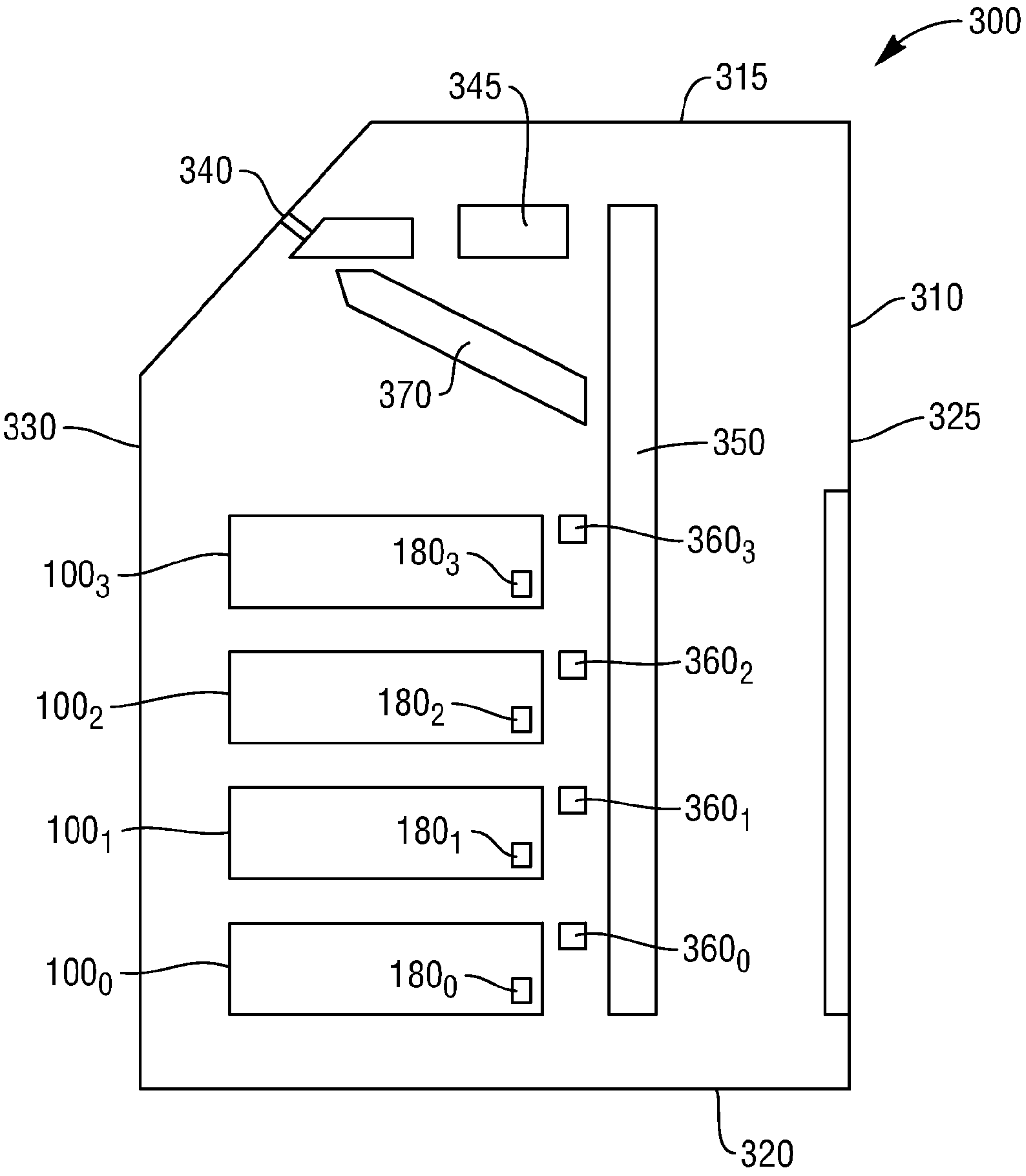
FIG. 3 illustrates a Self-Service Terminal (SST) in the form of an Automated Teller Machine (ATM) in accordance with an embodiment of the present invention.

Currency notes are manually or automatically loaded into the intelligent currency cassette 100 by authorized personnel at a trusted source. Aptly, the order and serial number and denomination of each currency note is known and is programmed onto the memory of the NFC tag associated with the cassette. The data set associated with the cassette (i.e. its unique ID) may optionally be in the tag in a remote data store connected via a network (such as the internet or the like) or both. A process to sync data held in two or more locations can optionally be utilized. This information is subsequently delivered to a financial institution as part of a cash in transit operation. The transported cassettes are then loaded into an automated bank vault or other such terminal which can hold multiple cassettes. For example, shown in FIG. 3 is an ATM 300 able to hold four currency cassettes. Aptly, each currency cassette $\mathbf{100}_{0\ldots3}$ stores a stack of notes having a pre-determined currency denomination. The ATM 300 includes a secure housing 310 which includes a top wall 315 and floor standing wall 320 together with a back wall 325, front fascia 330 and side walls (not shown). The front fascia 330 includes a bill entry/exit slot 340 and server via which a user can present a bunch of currency notes or single currency note. The bill entry/exit slot 340 is also an outlet slot whereby items of media such as currency notes are returned or are dispensed to a user dependent upon a user requirement. Currency notes deposited are validated by a bill validator 345. The bill validator includes imaging apparatus which can determine a denomination and serial number associated with each deposited currency note. A bill transport path 350 which includes one or more rollers and/or endless belts is used to locate items of media one-by-one or as a bunch at a desired storage currency cassette 100. The ATM 300 can thus be utilized to dispense currency notes which are stored in the currency cassette. Alternatively and/or additionally, the ATM can be utilized to receive currency notes deposited individually or as a bunch at the slot 340. Alternatively or additionally the ATM 300 provides a secure housing for full currency cassettes 100. Rather than receive and dispense currency notes one-by-one via a suitable pick mechanism, the terminal can thus be merely used as a storage unit for a whole currency cassette and its contents.

Each currency cassette $\mathbf{100}_{0 \ldots 3}$ includes a respective NFC communication tag $\mathbf{180}_{0 \ldots 3}$ which, when duly located in the ATM 300, is located sufficiently proximate to an antenna of a respective NFC reader $\mathbf{360}_{0 \ldots 3}$ so that wireless communication can automatically occur between a tag and its respective reader. The NFC tag 180 in a container thus is located proximate to a respective reader when the container is properly mounted in the ATM 300. This enables data to be read by the terminal 300 which can thus establish and associate data from each currency cassette with the terminal. For example, the terminal 300 can store the unique ID of each currency cassette in the terminal and a total value of currency notes in each cassette. Aptly, a serial number and order of all currency notes in all currency cassettes may also be stored. As currency notes are picked one-by-one and returned to the input/output orifice 340 via the transport pathway 350 and bill return path 370, parameters associated with the dispensed currency notes are monitored and continually kept up to date for each currency cassette. Aptly, one or more of the currency cassettes is a currency cassette which includes an NFC tag. Aptly, one or more of the currency cassettes is a "conventional currency cassette" in the sense that it does not include an NFC tag. It will be appreciated by those skilled in the art that conventional currency cassettes include a set of magnets (not shown) which are utilized to program a set of Reed switches arranged in a terminal proximate to where a currency cassette is mounted when located in the terminal.

FIG. 4 illustrates a dual-pick interface card (DPIC) according to certain embodiments of the present invention which provides a dual-interface to two currency cassettes. A conventional Reed switch interface as well as an NFC antenna reader/interface is optionally provided. This allows the use of legacy magnetic switches for cassette configuration as well as NFC enabled configuration.

As illustrated in FIG. 4, each of the two near field communication antenna 400 are connected to a multiplexor 410. When one or more currency cassettes is in the terminal 300 which includes an NFC tag, these antenna read the appropriate information from a respective NFC tag and this information is selectively directed by the multiplexor 410 to a reader 360 which can then communicate to a central processing unit 420 of the terminal via a wired communication link such as a USB connection 430. The multiplexer 410 connects a respective antenna to the reader under control of a control signal generated by the CPU 420. In use, a conventional identification system can be used to determine when a cassette is loaded in a terminal. For example, each cassette includes an array of magnets that set a matching array of Reed switches in a pre-set configuration. Subsequent to a cassette being identified, the NFC Reader 360 receives antenna received data from the antenna associated with the reader. This is used to determine if the input cassette is a conventional cassette or is NFC enabled. If NFC enabled data can be read from (and thereafter optionally written to) the NFC tag, it can be determined that the cassette is NFC tag enabled.

FIG. 5 illustrates a cash management system 500 for tracking cash and events which occur with respect to containers used to transport cash. The system includes one or more bank branches 510 which can be accessed by customers. The system 500 also includes one or more ATMs 300. These ATMs may be freestanding terminals provided at various locations and one or more of the ATMs themselves may be located in a respective bank branch 510. A cash management center (CMC) 520 is used to replenish containers, and access here is only provided to authorized personnel. The system 500 optionally includes a reporting and counting center (RCC) 525 as part of the CMC 520 (although such a center may be a discrete further node connected to the network or be incorporated in another node). The RRC 525 receives data from the various nodes of the system and stores characteristics associated with currency in transit and at the various locations in the system. For example, a total amount in the system, a total amount of ç10 notes in the system, an amount of currency in one or more ATMs, an amount of currency in transit and/or replenishment data or the like. Such information can be used in real time or at the end of the day or week etc. to make decisions to improve efficiency and/or profitability. A cash in transit process 530 is illustrated during which cash in a currency container such as a currency cassette or CIT bag is moved from one location to another. Likewise, distribution 540 is illustrated whereby cash is transported from one location to another via a distribution vessel such as a truck. The cash management system also includes one or more mobile terminals 550. These may be smartphones or mobile phones or tablet computers or the like. These communicate wirelessly via a wireless communication link 560 to a network 570 such as the internet. A remote server 580 or bank of servers is likewise connected to the internet 570 for communication with the parties in the cash management system. The cash management system 500 thus includes multiple nodes with the bank branches 510 each being a respective node and the ATMs or other such Self-Service Terminals (SSTs) each being a respective node and the management center 520 being a node and each item of cash in transit being an node and each distribution element being a node and each mobile terminal 550 being a node. The nodes are thus end points in the system. Optionally, the nodes are a CM Reporting Centre or user terminals in branches that are used to monitor cash levels.

Figure 6:
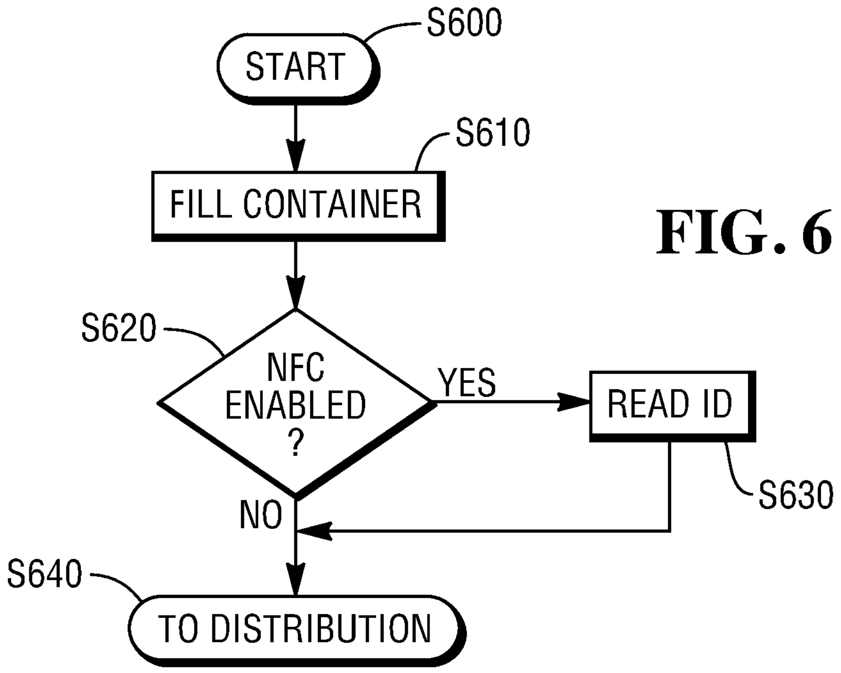
FIG. 6 illustrates a loading cycle.

FIG. 6 illustrates a cash in transit (CIT) process 530. The process starts at step S600 with an empty currency cassette 100. FIG. 6 helps illustrate the filling of the cassette at a secure location and the use of an NFC tag and unique ID to update information about the cassette either storing the information within the NFC tag on the cassette and/or via the internet 570 to the remote server 580. At step S610 a requisite number of currency notes having a desired denomination are filled into the cassette. A determination is then made at step S620 as to whether or not the cassette is a legacy-type cassette or a managed cassette. If it is determined that the cassette is a managed cassette then the NFC tag 180 on the cassette is read to obtain an ID of the cassette and then written to, to indicate the currency notes information loaded. Information about the cassette and currency notes is communicated via the network to the remote server 580 where this information is stored. This data transfer may occur contemporaneously with the filling process or at a subsequent pre-determined time or times. The reading and writing of information to the tag 180 on the currency cassette is illustrated by step S630. Once this operation is completed, or if at step S620 it is determined that the cassette is a legacy-type cassette without an NFC tag, the cassette is moved to distribution 540. This is illustrated at step S640. It will be appreciated at this point in time that the server node 580 is operable to receive data associated with the currency note which is loaded. Thereafter, data can be written to the server node as the cassette is transported and used. A record associated with each cassette and which is held at the server node is continually updated or at least updated at pre-determined time intervals.

Figure 7:
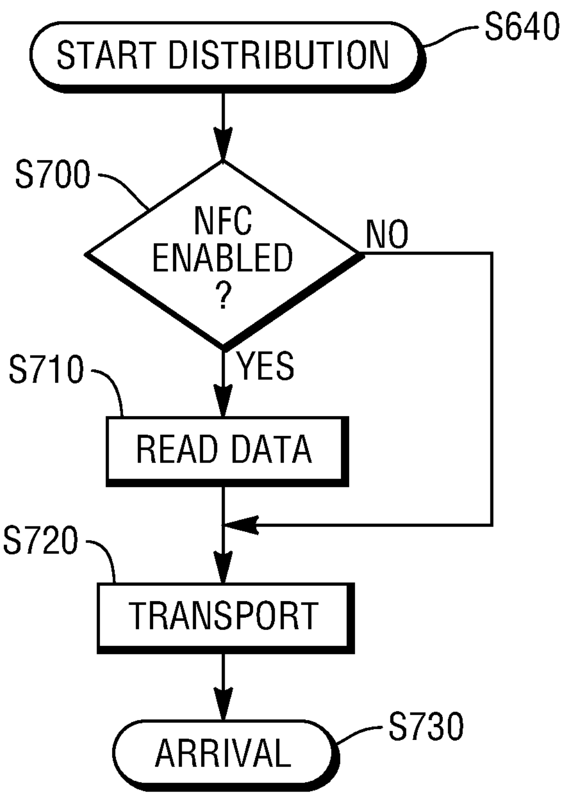
FIG. 7 illustrates a dispatch cycle.

FIG. 7 illustrates the transportation of a filled cassette to a pre-determined location such as an ATM 300 or bank branch 510. When the cassette is passed on to distribution at step S640 the cassette is flagged to be moved by a suitable mode of transportation. For example, by being loaded onto a truck. An authorized person having possession of the vehicle using a reader such as a smartphone or tablet or other such handheld terminal reads the NFC tag of each cassette being loaded for distribution. The mobile terminal holds records associating the user of the mobile terminal with a time and place and other associated data. A record can thus be generated which associates the cassette with a person and with a vehicle in possession of the container. Other information can of course be uploaded such as currency value and/or serial numbers of currency notes. This information is forwarded to the remote server node 580 where the record associated with a currency cassette is updated to add the information associated with the event of being logged for distribution. Aptly, if the information cannot be forwarded at any particular moment in time, the data is stored and forwarded subsequently when possible. A determination is made at step S700 as to whether or not the cassette is an NFC enabled cassette. If the cassette is NFC enabled, then the tag is read and data updated via the internet 570. Once this is completed or if it is determined that the cassette is a legacy cassette which is not NFC enabled, then the cassette can be transported. The step of transportation is illustrated by step S720 in FIG. 7. Ultimately, the cassette arrives at its target destination such as an ATM 300 or branch 510 where the cassette is to be utilized. This arrival step is illustrated by step S730.

Figure 8:
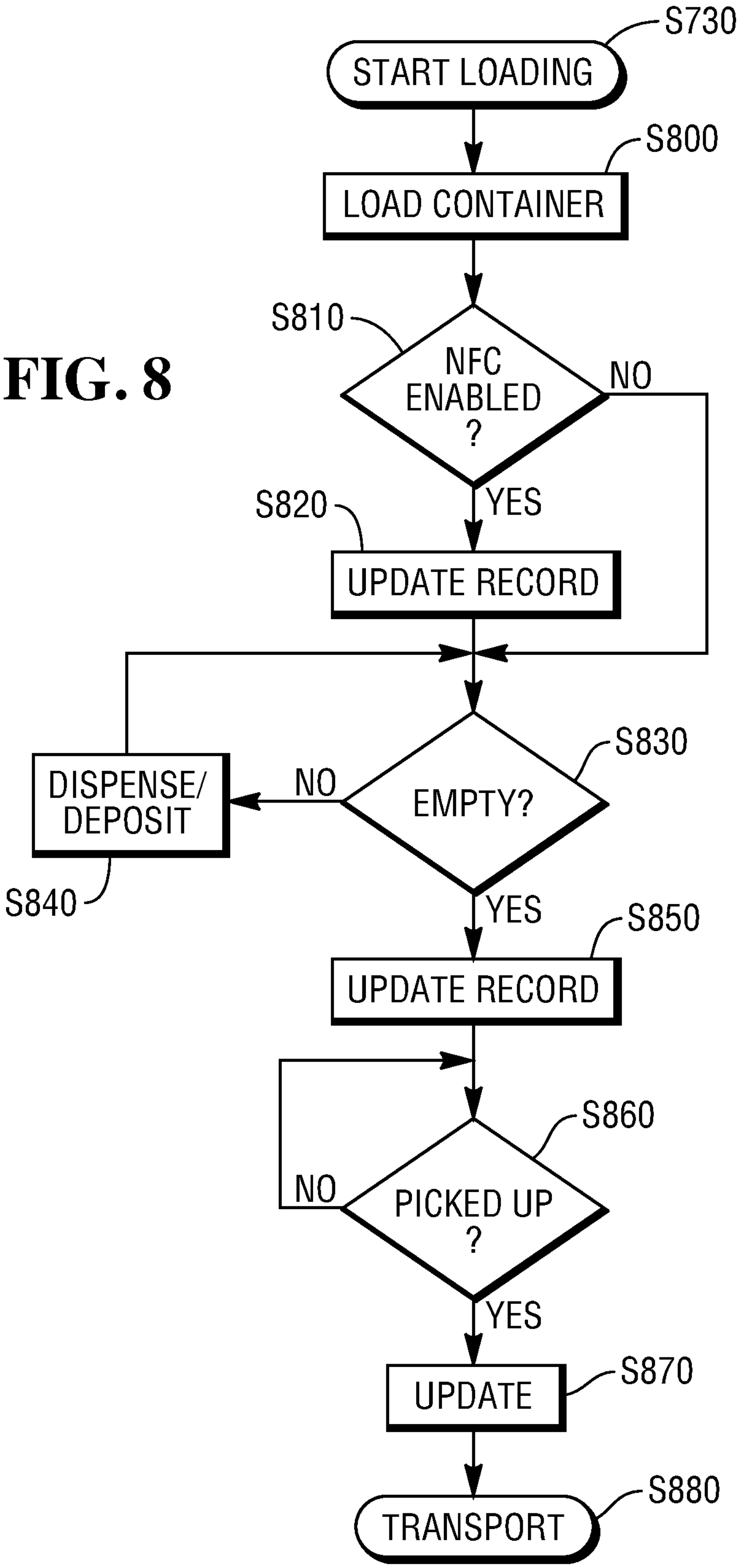
FIG. 8 illustrates a use cycle.

Personnel associated with the distribution then pass the cassette to a branch staff member or install the cassettes directly into an ATM. FIG. 8 illustrates the example of loading the cassette into an ATM. This step is illustrated by step S800 and is completed by an authorized user opening a secure door at the ATM and physically mounting a cassette in a docking station in the ATM. The authorized person at this point in time may also remove empty cassettes or cassettes which are partially empty or too full or too empty. At step S810 a determination is made as to whether or not the cassette is a conventional cassette or whether an NFC tag can be validly read. If the reader in the ATM can read data from an NFC tag of the cassette, this indicates that the cassette is NFC enabled and information identifying the cassette and the terminal in which it is mounted can then automatically be sent via the internet to the remote server 580. This step of updating the record at the remote server 580 is illustrated by step S820. Mounting the cassette in the ATM is an event which is logged and this terminates possession of the container for the distributor personnel. If the cassette is given to a staff member of the branch a smartphone or other reader device of that staff member is used to register handover of possession. Such an event is also logged.

The cassette is thereafter used with people being dispensed currency notes, in which case currency notes are removed from the cassette, or people depositing currency notes in which case currency notes may be added to the currency cassette. Notes added or dispensed are reported back to the remote server 580. A determination is made at step S830 as to whether or not a cassette is empty (or at least almost empty). If it is determined that the cassette is not empty or is not almost empty, notes are dispensed or deposited and each deposit or dispense event is uploaded via the internet 570 to the remote server 580. This dispensing and updating or depositing and updating step is illustrated as step S840 in FIG. 8. When it is determined at step S830 that the cassette is empty, then this information is updated to the record at the remote server 580 via the internet 570. This updating step is illustrated as step S850 in FIG. 8. Determination that the cassette is empty or is nearly empty triggers distribution to be dispatched to remove the cassette. The step of determining whether a cassette has been picked up and thus removed from the ATM is illustrated by step S860 in FIG. 8. If the cassette has been removed at step S860, this occurs by a human user scanning the cassette with a reader such as an app-enabled smartphone which identifies the user picking up the cassette and a time and date and location of pick up. This information is updated to the remote server 580 at step S870. The cassette is then transported via a distribution step S880.

Aptly, according to certain embodiments of the present inventions, bag and/or cassette movements may be tracked through swiping with a mobile device or inserting into an ATM or other such SST. Cash adds and withdrawals from the cash container are tracked by a user workflow on a mobile device supporting dual custody operations or automatically by the ATM. Fraudulent access is detected through sensing capabilities of the modified cassette and is recorded on the NFC device and through the ATMs ability to report access events. On balancing, any outages are reconciled against the cassette custody audit held via the internet or other such network supported by the data in the NFC devices.

Aptly, using a small NFC circuit, legacy cassettes can be updated to log the occurrence of tamper events or events associated with normal usage. Alternatively, brand new currency cassettes can be manufactured which incorporate such NFC circuitry and which can thus likewise be used to log occurrence of tamper events. This can be utilized to not only identify a time associated with a tampering, but also may be used to indicate still further information such as a person having custody of the cassette at that moment in time.

Aptly, NFC technology is utilized to identify currency and containers for the currency as it is moved around a bank branch or system. The NFC technology can be used to uniquely identify a cassette as well as read information stored in the NFC tag on the cassette. This enables tracking of cassettes/cash using embedded hardware and/or handheld readers and/or desktop readers along with NFC tag technology. Aptly, because unique IDs are allocated to individual cassettes, faults during operation can be tracked over time and a determination made that there is in fact a fault with a particular currency cassette rather than the fault being erroneously associated with a terminal in which the cassette is mounted.

Aptly, certain embodiments of the present invention provide an elevated degree of security compared to conventional cassettes. This is because cassettes can be uniquely identified by an address or other such identifier. This address must be known before access to a terminal holding the cassette can be allowed. In other words, if the UID of a cassette is not recognized (because it has been incorrectly inserted or is a cassette type incompatible with the terminal in which it is fitted) the cassette will be rejected and no currency dispensed from it or loaded into it. Likewise, communication security can be improved because a key associated with the NFC tag must be known before any reader can communicate with the tag. This provides an ability to guarantee the ability to read a specific cassette rather than merely being able to read all cassettes in a system. Certain embodiments of the present invention can utilize information held on an NFC tag to carry out an auto-update cash total and/or auto-flag reconciliation issues and/or auto-set cassette configuration.

Certain embodiments of the present invention enable the tracking of consolidation of cassette loads to logically track physical mixing of cassettes through summing or combining data on chips/in cloud associated with chips.

Certain embodiments of the present invention provide for device health tracking and the ability to trigger appropriate action. For example, a container age may be continually tracked or a container health may be continually tracked or container work cycles may be continually tracked or relevant host system data such as performance or workload may be continually tracked and decisions taken based on such tracking information to trigger appropriate action.

Certain embodiments of the present invention enable cassettes which retain an adequate supply of currency notes but which would conventionally be taken out of service to be identified and to be left in service. This can reduce distribution effort and thus reduce cost.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A currency container for currency notes, comprising:

a container body for storing a plurality of currency notes;

at least one NFC tag for indicating at least one parameter associated with the container, wherein the at least one parameter including a serial number of each of the plurality of currency notes stored in the container and the at least one NFC tag operable to be read by an NFC reader associated with just the container, the container body includes the NFC tag, and wherein the at least one NFC tag includes a temperature sensor, the temperature sensor configured to be read from the NFC tag to indicate detect changes in temperature that can indicate whether a lid of the currency container is opened or closed.

2. The currency container as claimed in claim 1, further comprising:

the parameter comprises a unique ID code of the container and/or currency type identifier for currency notes stored in the container and/or a number of notes stored in the container.

3. The currency container as claimed in claim 1, further comprising:

the NFC tag comprises at least one data store that stores time and/or date data associated with a pre-determined event.

4. The currency container as claimed in claim 3, further comprising:

the pre-determined event comprises the container body being tampered with and the container further comprises at least one tamper switch.

5. The currency container as claimed in claim 4, further comprising:

the container further comprises at least one visual and/or audible cue that receives a trigger signal responsive to the tamper switch determining that a tamper event has occurred.

6. The currency container as claimed in claim 3, further comprising:

the pre-determined event comprises coincidence with a pre-determined time and/or date and the container further comprises an environmental sensor.

7. The currency container as claimed in claim 1, further comprising:

a rechargeable battery connected to the NFC tag.

8. The currency container as claimed in claim 1, further comprising:

the NFC tag comprises a data store.

9. The currency container as claimed in claim 8 wherein the data store is read only or is a read/write data store.

10. The currency container as claimed in claim 1 wherein the NFC tag has a maximum working distance of less than 20 cm.

11. The currency container as claimed in claim 1 wherein the container body comprises a flexible tamperproof bag or currency cassette.

12. A Self-Service Terminal (SST) comprising:

at least one docking station for a currency cassette, wherein the at least one docking station integrates the currency cassette into the SST;

an NFC reader device associated with the currency cassette and for wirelessly reading data from an NFC tag in a currency cassette docked in the docking station including serial numbers of each currency item held in the currency cassette, the currency cassette includes the NFC tag, and wherein the SST includes other currency cassettes and other NFC readers and each of the other currency cassettes associated with a particular one of the other NFC readers and wherein the NFC reader is configured to read a temperature sensor that is included in the NFC tag to detect changes in temperature that can indicate whether a lid of the currency cassette is opened or closed.

13. The SST as claimed in claim 12 wherein the SST is an Automated Teller Machine (ATM).

14. The SST as claimed in claim 12 wherein the reader device is a contactless reader that reads data stored in a proximate NFC tag.

15. A method of tracking currency, comprising the steps of:

associating at least one currency note with a currency container comprising an NFC tag, the association of the at least one currency note with the currency container stored in data within the NFC tag, and integrating the currency container into an Automated Teller Machine (ATM);

tracking events associated with said currency container via an NFC reader associated with the currency container, the tracked events including a dispensing of the at least one currency note and updating the association data stored on the NFC tag to track the dispensing of the at least one currency note, wherein the ATM includes multiple other NFC readers, each of the other NFC readers associated with a different currency container of the ATM, wherein tracking the events further includes reading a temperature sensor of the NFC tag to detect changes in temperature that indicate whether a lid of the currency container is opened or closed.

* * * * *